Figure 1:
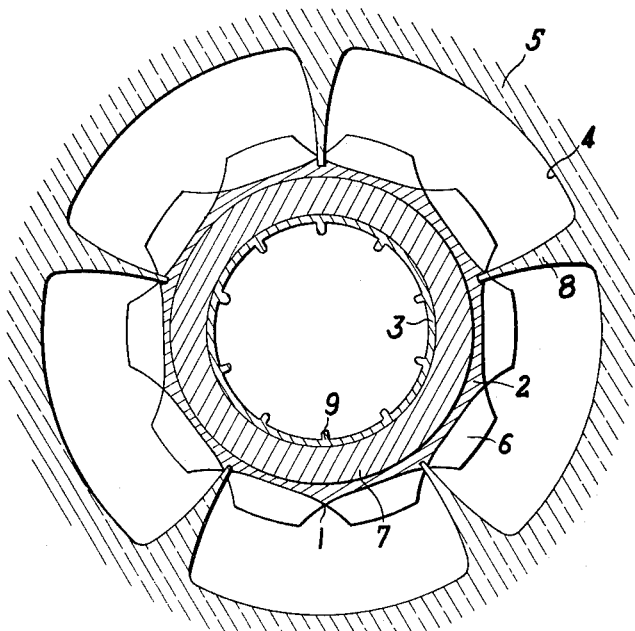

July 19, 1966  B. BOUDOURESQUES ETAL  3,261,759
FUEL ELEMENT FOR NUCLEAR REACTOR
Filed June 27, 1963  4 Sheets-Sheet 1

United States Patent Office 3,261,759
Patented July 19, 1966

3,261,759
FUEL ELEMENT FOR NUCLEAR REACTOR
Bernard Boudouresques and Ennemond Maillet, Paris, and Jacques Pelce, Fontenay aux Roses, France, assignors to Commissariat a l'Energie Atomique, Paris, France
Filed June 27, 1963, Ser. No. 291,045
Claims priority, application France, July 6, 1962, 903,239; Oct. 17, 1962, 912,545, Patent 83,307
5 Claims. (Cl. 176—81)

The present invention relates to nuclear fuel elements of tubular shape and is more especially concerned among fuel elements of this type with those which are cooled both externally and internally by two streams of a cooling fluid which preferably flow in the same direction. The invention is more especially concerned among said tubular elements with those which are composed of natural or very slightly enriched uranium and which are clad both internally and externally, said fuel elements being intended to be employed in the channels of nuclear reactors of the graphite-moderated and gas-cooled type.

It is known that, in order to increase the power which is extracted per unit length of a tubular fuel element having a given mass, the diameter of said tube can be increased while also being reduced in thickness, thereby increasing the surface area which is in contact with the streams of coolant and reducing the temperature differences in the fissile or fertile material which is contained in said fuel element.

However, a limitation is imposed in this respect by the neutron leakage which is characteristic of any fuel element which has a large surface area and by the absorption of neutrons by the cans, the cross-section of which increases with the perimeter.

The invention has for its object, in a nuclear fuel element of tubular configuration, to improve the extraction of heat in the internal portion of said element without limiting in an appreciable manner the rate of flow of coolant.

The invention essentially consists in providing on the surface of the inner can projecting portions of small height which make it possible to obtain a suitable heat transfer while at the same time offering to the flow of coolant only a low resistance per unit area.

The projecting portions can advantageously be provided in the form of fins which have various orientations and are necessarily limited both in number and height or else can form mere asperities, rough excrescences or corrugations on the surface of the can. In another form of embodiment, the can surface can even be provided at the same time both with corrugations and with fins of small height which are either added or formed solid with the can.

It is accordingly possible to limit to a very great extent the neutron leakage and the cross-section of the neutron-absorbing materials of the inner can. Inasmuch as the height of the fins or the size of the corrugations can furthermore be very small, the pressure drops which take place in the internal flow become very appreciably smaller than those which result from the outer can (which is usually provided with cooling fins having a height which is not negligible), thereby making it possible to produce without difficulty a high rate of flow of fluid within a relatively small diameter.

The temperature of the inner can and of the fuel which is located between this latter and the outer can can also be appreciably higher by virtue of a suitable choice of the material which constitutes said inner can and of the type of bond employed for the purpose of securing the fuel material to the wall of said tube.

Apart from this principal arrangement, the invention consists in various secondary arrangements which will be brought out in greater detail in the following description of a number of examples of embodiment which are given by way of indication and not in any sense by way of limitation.

Figure 2:
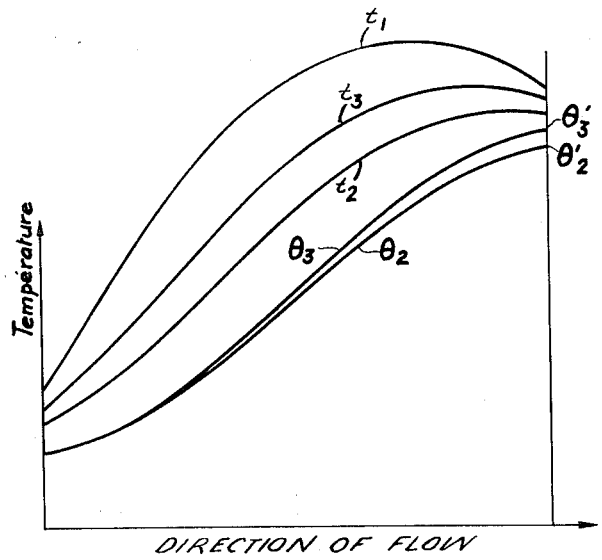
Figure 3:
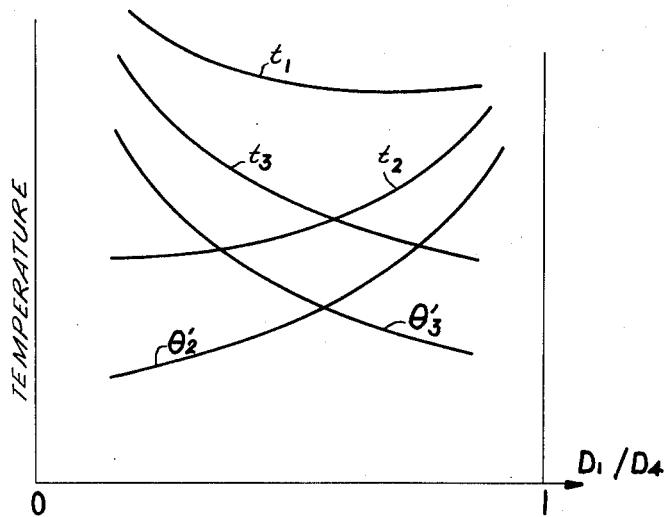
Figure 4:
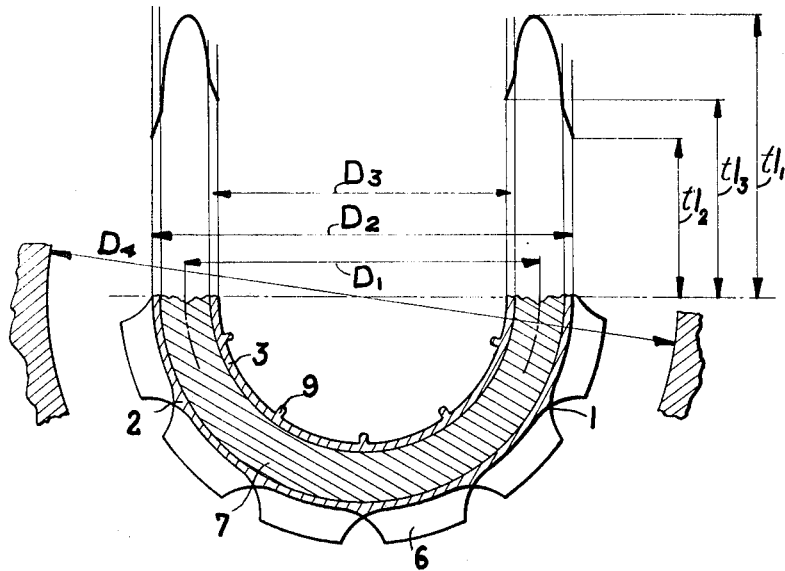
Figure 5A:
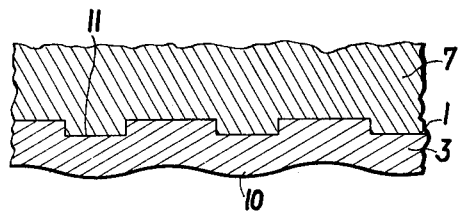
Figure 5B:
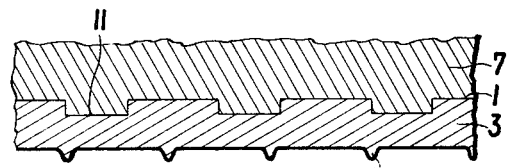
Figure 5C:
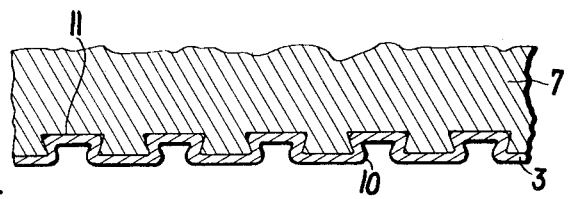
Figure 7:
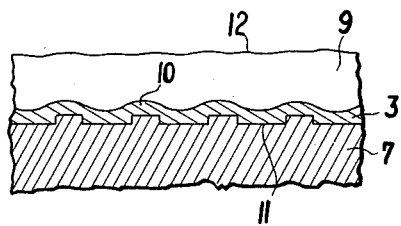
Figure 6:
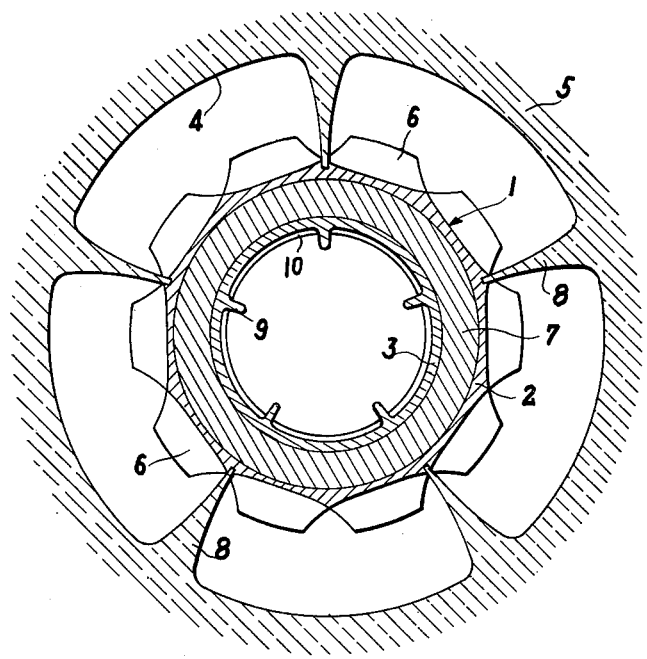

In the accompanying drawings:

FIG. 1 illustrates diagrammatically a transverse sectional view of a fuel element in accordance with the invention;

FIG. 2 represents a family of curves which illustrate the development of temperatures along a reactor channel containing a fuel element of the type which is illustrated in FIG. 1, FIG. 3 shows the temperature relationships in the channel produced by variations in diameter of an annular fuel element having a given cross-section, FIG. 4 shows the temperature distribution in a longitudinal cross-section of a fuel element of the same type as the fuel element shown in FIG. 1, FIGS. 5a, 5b and 5c represent certain profiles of corrugations which are applicable to the surface of the inner can, FIGS. 6 and 7 illustrate another form of embodiment of the invention.

In FIG. 1, the tubular element 1 which is shown looking on a transverse sectional plane is provided with an outer can 2 and with an inner can 3. The fuel element is located inside a cylindrical channel 4 which is formed through a block 5 of moderator material. The outer can 2 is fitted with cooling fins 6 which are distributed over the periphery of said can so as to form, for example, open herring-bones which induce a vortical motion in the flow which is established between said can and the channel wall, thereby improving the removal of heat to a very appreciable extent.

The fissile or fertile material 7 of the fuel element is disposed between the outer can 2 and the inner can 3, there being formed in those surfaces of the cans referred-to above which are in contact with the fissile material anchoring grooves or any other arrangement which prevents the separation of the cans during operation of the reactor and also improves the mechanical bond between said cans and the fuel material.

The fuel element 1 is held in position in the interior of the channel 4 by means of centering partitions 8. The inner can 3 is in turn provided with projections of very small height and number such as short longitudinal fins 9, the function of which will be explained in greater detail below.

If the mean diameter of the fuel element is designated by the reference D1 and the external diameter of the can 2 is designated by the reference D2, while the internal diameter of the can 3 is designated by the reference D3 and the diameter of the channel 4 is designated by the reference D4, it is observed that the flow cross-sections provided for the coolant on the one hand inside the outer annular space formed between the can 2 and the channel and, on the other hand, inside the can 3 depend on the cross-sectional area of the fuel and the diameters D2, D3 and D4 referred-to above. Allowance should also be made in the foregoing calculation for the designed cross-sectional area of the can 2 and the can 3 as well as the total cross-sectional area of spacer elements or centering partitions 8 which join the element to the channel.

The temperature distribution along the channel is represented diagrammatically in the graph of FIG. 2, the curves of which give respectively:

At $t_1$: the maximum temperature of the fissile material or fertile material contained in a fuel element.

At $t_2$: the maximum local temperature which is chosen for the purpose of defining the thermal level which must not be exceeded in the outer can 2.

At $t_3$: the maximum local temperature in the inner can 3.

At $\theta_2$: the mean temperature of the fluid which circulates in the outer annular space.

At $\theta_3$: the mean temperature of the fluid which circulates in the inner can.

At $\theta'_2$ and $\theta'_3$: the temperatures which correspond to $\theta_2$ and $\theta_3$ of the fluid at the outlet of the fuel element.

When once the foregoing data have been defined, it is known that the object to be achieved is to obtain high coolant temperatures after the flow of said coolant over the fuel element, while limiting as far as possible the functional temperatures of the fuel and of the outer and inner cans.

If the outer and inner walls of the fuel element are fitted with cans of the same design on which are formed fins of the same type having the same height and the same spacing, the conditions of equality $\theta_2=\theta_3$ and $t_2=t_3$ are approximately satisfied when $D_1=\frac{2}{3}D_4$, while this value which is obtained by calculation can vary slightly depending on the neutron flux profile in the fuel element. Since the diameter $D_1$ as thus defined and the resulting internal surface area are too large for the use of natural or slightly enriched uranium, the present invention proposes to reduce them while limiting at the same time the neutron losses which result therefrom.

If the relative diameter $D_1/D_4$ of the tubular element 1 inside its channel 4 is caused to vary while retaining the cross-sectional area of the fuel, the working characteristics of the channel develop as shown in FIG. 3, which is established in the case of outer cans 2 and inner cans 3 of a given type and a pressure drop in the fluid which is assumed to be constant. When it is sought to reduce the ratio $D_1/D_4$, the external temperature $\theta'_2$ is accordingly reduced; on the other hand, the internal temperature $\theta'_3$ increases, the cross-sectional area of flow thus decreasing more rapidly than the internal perimeter. Under these conditions, there results a rapid increase in the maximum temperature $t_3$ of the inner can.

In accordance with the invention, the cooling of the inner can is facilitated by reducing the friction thereof, even at the price of a less intense heat transfer inasmuch as the fluid circulates within the interior at a higher velocity and a higher flow rate, so remaining colder. When a coefficient of friction per unit area is chosen which is 5 to 25 times lower in the case of the inner can than in the case of the outer can, for example, the mean relative diameter $D_1/D_4$ of the tube inside its channel can be reduced by a minimum of $\frac{2}{3}$ to $\frac{1}{2}$.

To this end, there are formed on the outer can fins which are relatively high compared with the internal corrugations and which are, for example, parallel to the longitudinal direction fo the flow or which are preferably oblique and symmetrically arranged in a herring-bone pattern. In order to offer less resistance to the flow, the inner can is provided only with fins of very small height which are fairly widely spaced apart and parallel to the direction of flow or slightly inclined thereto.

In accordance with a particular form of embodiment, said fins can even be dispensed with altogether, in which case the inner can is provided with corrugations which are intended to improve the cooling to a certain extent while offering a resistance to the flow which is only slightly greater than that which would be offered by a smooth surface. Said resistance can, for example range between one and one half and six times the resistance of a smooth can. In the case of a fuel element having a small internal diameter, an inner wall which has simply been roughened is sufficient for the purpose.

In the case of inner cans having a heat transfer coefficient which is lower than that of the outer can and having the dimensions chosen in accordance with the present invention, the temperature profile in the fuel element is shown in FIG. 4. The local temperature $t_{13}$ of the inner can 3 remains high but is nevertheless limited by the temperature $\theta_3$ of the internal fluid which differs only slightly from the temperature $\theta_2$ of the external fluid.

The corrugations which are formed on the inner wall can be of various kinds such as those which are illustrated in FIG. 5.

In accordance with FIG. 5a, the corrugations can be simply constituted by undulations 10 adapted to correspond to the anchoring grooves 11 which are, for example, either transverse or helicoidal and are formed in the internal surface of the fuel tube 1 in order to maintain the can 3 in close contact with said fuel tube.

In accordance with FIG. 5b, the profiles of the corrugations 10 and of the anchoring grooves 11 can be independent, on the one hand in order to meet more effectively the conditions of adhesion of the can to the tube and on the other hand in order to generate a turbulent flow, since turbulent flow or agitation is always favorable to heat transfer between the internal wall and the coolant.

FIG. 5c relates to an alternative form in which the anchoring grooves of the can have a dovetail profile of relatively small depth and which accordingly provide for the fluid transverse grooves having an approximately circular shape in which said fluid is intended to adopt a local vortex motion.

Finally, it is useful to note that it is possible to combine the effects produced respectively by longitudinal fins of small height and by corrugations of a heat transfer surface, in such manner that the heat transfer which is effected by the fins is further activated by the turbulent flow which is generated in the vicinity of the wall by the corrugations, thereby permitting a substantial increase in the active surface area, while losses of pressure remain within perfectly acceptable limits.

FIGS. 6 and 7 illustrate this particular form of embodiment and make use of the same reference numerals as those of FIGS. 1 and 5 in order to designate similar elements. As can be seen in this case, the inner can 3 is again provided with longitudinal fins 9 of small height which preferably extend over the full length of the fuel element. However, as shown in greater detail in FIG. 7, the surface of the cylindrical fuel slug 7 which is in contact with the can 3 is also provided with circular grooves or channels 11 which are intended to serve for the purpose of anchoring the can.

If the internal cladding of the basic fuel element 7 or slug is accordingly effected by applying the can 3 by hydrostatic pressure in such manner that the inside wall thereof closely corresponds to the shape of the grooves 11 which are formed in the slug and if said grooves are of fairly substantial depth, this cladding operation produces on that surface of the can which is in contact with the internal flow of fluid undulations or corrugations 10 which are intended to initiate, as has already been stated, a local turbulent motion of the fluid streamlines and to prevent the formation of a stationary boundary layer between the longitudinal fins 9. At the time of application of the can by hydrostatic pressure, the outer edge 12 of the fins 9 is in turn subjected also to a light undulation, the influence of which is practically negligible.

By virtue of the foregoing arrangement, the longitudinal fins are in contact with the highly turbulent flow which is induced by the corrugations, provided that the height of said fins is not too great. The coefficient of heat transfer along the sides of said fins increases to an appreciable extent while the pressure drop which is induced in the flow is nevertheless maintained at an acceptable value which is in any case little greater than the pressure drop which would be induced under the same conditions, either by the longitudinal fins alone or by a corrugated surface alone.

Generally speaking, and irrespective of the form of embodiment considered, the heights and intervals of these various types of fins and corrugations are chosen as a function of the characteristics of the fluid in order to obtain the best compromise between transfer of heat and resistance to flow. The temperature which an inner can is able to withstand when provided with fins of very small height and/or corrugations is always appreciably higher than the maximum temperature which can be permitted in the case of an external can having inclined fins which are more sensitive to aerodynamic forces. The inner can material can also be chosen in such manner as to withstand without being corroded a higher temperature than that of the outer can.

It will be understood that the invention is not limited in any sense to the examples of construction which have been described and illustrated but is intended, on the contrary, to include within its scope all alternative forms.

What we claim is:

1. A canned nuclear fuel element of tubular shape including an inner and an outer can, said inner can having projecting portions of small height and heat transfer fins on said outer can cooled by a fluid which circulates both externally and internally thereof the surface of the inner can having a coefficient of friction of from 5 to 25 times less than the coefficient of friction of the outer can, and the surface of the inner can offering to the flow of the fluid a resistance per unit area of from 1.5 to 6 times greater than the resistance of said inner can without said projecting portions.

2. A fuel element as described in claim 1, characterized in that said projections of small height being longitudinal fins.

3. A fuel element as described in claim 1, characterized in that said projections of small height being corrugations disposed at an oblique angle with respect to the axial direction of the internal flow of fluid.

4. A fuel element as described in claim 3, characterized in that the corrugations of the inner can are determined by the profile of the anchoring grooves which are formed in the internal surface of the fuel slug so as to ensure the adhesion of the inner can.

5. A fuel element as described in claim 3, characterized in that the corrugations of the inner can form circular grooves so as to initiate vortices which are maintained in the internal flow of fluid.

References Cited by the Examiner

UNITED STATES PATENTS

| | | | |
|---|---|---|---|
| 2,093,810 | 9/1937 | Karmazin | 165—179 X |
| 2,365,670 | 12/1944 | Wallace | 165—179 X |
| 2,537,797 | 1/1951 | Simpelaar | 165—179 |
| 2,890,158 | 6/1959 | Ohlinger et al. | |
| 2,906,683 | 9/1959 | Quackenbush | 176—64 |
| 2,949,416 | 8/1960 | Wheelock | 176—81 X |
| 3,154,141 | 10/1964 | Huet. | |

FOREIGN PATENTS

| | | |
|---|---|---|
| 1,234,242 | 5/1960 | France. |
| 789,257 | 1/1958 | Great Britain. |
| 911,466 | 11/1962 | Great Britain. |

LEON D. ROSDOL, *Primary Examiner.*

REUBEN EPSTEIN, CARL D. QUARFORTH,
*Examiners.*

R. L. GRUDZIECKI, *Assistant Examiner.*